(12) United States Patent
Lee et al.

(10) Patent No.: US 7,292,708 B2
(45) Date of Patent: Nov. 6, 2007

(54) METHOD FOR BLINDLY EMBEDDING AND EXTRACTING A WATERMARK BY USING WAVELET TRANSFORM AND AN HVS MODEL

(75) Inventors: Seon Hwa Lee, Taejon (KR); Sanghyun Joo, Taejon (KR); Young Ho Suh, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 704 days.

(21) Appl. No.: 10/778,552

(22) Filed: Feb. 17, 2004

(65) Prior Publication Data

US 2005/0094845 A1    May 5, 2005

(30) Foreign Application Priority Data

Oct. 29, 2003    (KR) .................... 10-2003-0076100

(51) Int. Cl.
*G06K 9/00* (2006.01)
(52) U.S. Cl. .................. 382/100; 382/251; 380/201
(58) Field of Classification Search ............... 382/100, 382/168, 172, 203, 232–235, 248, 250, 263–264, 382/274–276, 112, 114, 137, 139, 251; 700/94; 380/201, 238, 203
See application file for complete search history.

(56) References Cited

U.S. PATENT DOCUMENTS

| | | | | |
|---|---|---|---|---|
| 6,556,689 B1* | 4/2003 | Xia et al. | .................... | 382/100 |
| 6,674,876 B1* | 1/2004 | Hannigan et al. | ............ | 382/100 |
| 7,035,700 B2* | 4/2006 | Gopalan et al. | ............... | 700/94 |
| 7,113,615 B2* | 9/2006 | Rhoads et al. | ............... | 382/100 |
| 7,130,443 B1* | 10/2006 | Werner et al. | .............. | 382/100 |
| 7,171,019 B2* | 1/2007 | Miyake et al. | .............. | 382/100 |

OTHER PUBLICATIONS

Ming-Shing Hsieh, et al.; Hiding Digital Watermarks Using Mulltiresolution Wavelet Transform; IEEE Transactions on Industrial Electronics; vol. 48, No. 5; Oct. 2001; pp. 875-882.

* cited by examiner

*Primary Examiner*—Seyed Azarian
(74) *Attorney, Agent, or Firm*—Lowe Hauptman Ham & Berner LLP

(57) ABSTRACT

The present invention relates to a method for blindly embedding and extracting a watermark by using wavelet transform and a human visual system (HVS) model, which obtains both robustness and invisibility by applying the HVS model of NVF or JND imitating a human visual system to a middle frequency band for wavelet transformation and using a quantization step determined adaptively according to the importance of wavelet coefficient. A method according to the present invention includes the steps of: decomposing an original image by a wavelet and selecting a middle frequency band as a watermark embedment area; obtaining an HVS model having a human visual recognition information at each embedding position; determining the importance of the coefficient for each embedding position, and adaptively determining a quantization step for each embedment location by using the importance and the HVS model; quantizing each pair of embedment area by the quantization step and variably embedding a watermark sequence into a middle frequency band according to a value of the watermark; and performing inverse wavelet transform on an overall area into which the watermark sequence is embedded, and generating a watermarked image.

23 Claims, 2 Drawing Sheets

METHOD FOR BLINDLY EMBEDDING AND EXTRACTING A WATERMARK BY USING WAVELET TRANSFORM AND AN HVS MODEL

BACKGROUND OF THE INVENTION

1. Field of the Invention

The present invention relates to watermark embedment and extraction, and more particularly, to a method for blindly embedding and extracting a watermark by using wavelet transform and a human visual system (HVS) model, which obtains both robustness and invisibility. In the method, the HVS model imitating a human visual system is applied to a middle frequency band for wavelet transformation and a quantization step determined adaptively according to the importance of wavelet coefficient is used.

2. Description of the Related Art

As a user is charged for using digital contents, it has been actively studied to protect the copyright of the digital contents. The digital watermarking technique is the most widely used copyright protection technique in which information on a copyright holder is embedded into the digital contents but is not recognized by a human eye. Accordingly, the copyright holder can prove to hold a copyright or an ownership of the digital contents by extracting the copyright information from the digital contents when the digital contents are used or the copyright dispute occurs.

To achieve the purpose described above, the digital watermarking technique should have properties such as invisibility, robustness and tolerant error detection rate. The invisibility means that the embedded watermark cannot be easily recognized by a human eye. The robustness means that the embedded watermark is not destroyed or changed in spite of intended external conversion, lossy compression, various image processes and noises. However, since the invisibility and the robustness have tradeoff relation to each other, one of the most important aims of the watermarking technique is to obtain the robustness as well as the invisibility with minimizing degradation of image quality. Therefore, it has been actively studied to obtain both the robustness and the invisibility.

On the other hand, there are two kinds of watermarking techniques: a blind watermarking technique and a non-blind watermarking technique. In the blind watermarking technique, the watermark is extracted from the digital contents without any original data. In the non-blind watermarking technique, the watermark is extracted from the digital contents by using the original data.

The blind watermarking technique does not need any additional storage for the original data. Recently, the blind watermarking technique is actively studied because of its availability for Certification Authority. However, since the blind watermarking technique does not have any reference data for watermark extraction, it is available but is not robust against an attack.

Accordingly, the blind watermarking technique has been studied considering a data compression attack and an image processing attack such as filtration, especially a geometrical attack that is counted as a very strong attack to the blind watermarking technique.

Most of the techniques against the geometric attack are the watermarking technique for embedding a watermark into the digital contents in a frequency domain by using transforms such as DCT, DFT and DWT.

SUMMARY OF THE INVENTION

Accordingly, the present invention is directed to a method for blindly embedding and extracting a watermark by using wavelet transform and human visual system (HVS) model, which substantially obviates one or more problems due to limitations and disadvantages of the related art.

It is an object of the present invention to provide a method for blindly embedding and extracting a watermark by using wavelet transform and an HVS model, which maintains high quality of an image and is very robust against the various image processing attacks such as filtration and the data compression attack. In the method of the present invention, a watermark is combined with the HVS model imitating a human visual system and embedded into a wavelet middle frequency, and a quantization step determined adaptively according to the importance of wavelet coefficient is used.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for blindly embedding a watermark into digital contents by using a human visual system (HVS) model and wavelet transform. The method includes the steps of: (a) decomposing an original image by a wavelet and selecting a middle frequency band as a watermark embedment area; (b) obtaining an HVS model having a human visual recognition information at each embedment location; (c) adaptively determining the importance of coefficient value on each embedment location, combining the importance and the HVS model, and adaptively determining a quantization step for each embedding location; (d) quantizing each coefficients pair of embedment area by the quantization step and variably embedding a watermark sequence into a middle frequency band according to a value of the watermark; and (e) performing inverse wavelet transform on an overall area into which the watermark sequence is embedded, to generate a watermarked image.

In another aspect of the present invention, there is provided a method for blindly extracting a watermark from digital contents by using wavelet transform and a HVS model. The method includes the steps of: (a) performing wavelet transform on a watermarked input image with the same order of embedment, and calculating a significant coefficient from a middle frequency band; (b) obtaining the HVS model on each extraction location, which was used when embedding the watermark; (c) comparing the significant coefficient with absolute value of each coefficient pair at each extraction location, confirming a quantization step of embedment for each extraction location by using the HVS model, and performing inverse quantization on a coefficient pair of each extraction location, thereby extracting the watermark sequence; and (d) calculating similarity between the watermark sequence according to the key value from the user and the extracted watermark sequence, thereby determining whether the watermark exists in the digital contents.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

In the present invention, considering that human visual system is sensitive to variation of low frequency components and high frequency components are vulnerable to image compression process, a watermark sequence is embedded into a middle frequency band to achieve both robustness and invisibility.

A pair of coefficients within the middle frequency band have similar distortion characteristics to each other for various image processing attacks and a compression attack. Accordingly, in the present invention, a watermarking technique that has more stable performance by using a quantization step determined differently according to coefficient values of the middle frequency band is suggested instead of a method for quantizing a wavelet coefficient by a predetermined size. An HVS model that is imitates a human visual system is used so that invisibility after watermark embedment is improved.

Figure 1:
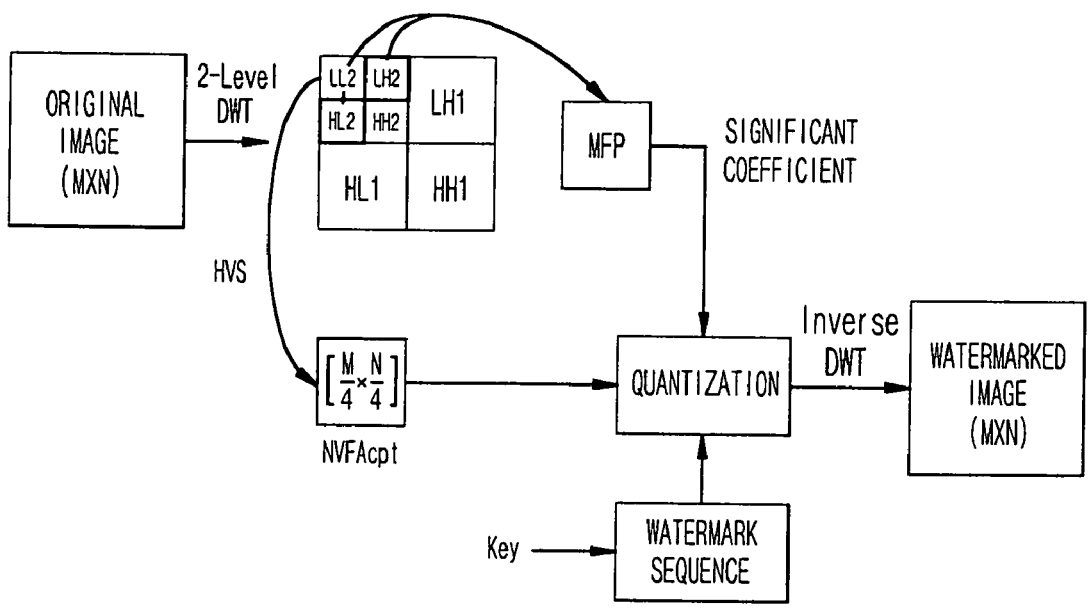
FIG. 1 illustrates a concept of watermark embedment according to the present invention.

FIG. 1 illustrates a concept of watermark embedment according to the present invention.

Referring to FIG. 1, an original image is decomposed by wavelet with a predetermined step and a watermark is embedded into the middle frequency band. In the embodiment shown in FIG. 1, the original image is decomposed by wavelet even in a two-level wavelet decomposition and a watermark sequence is embedded into the middle frequency bands LH2 and HL2. Here, the watermark sequence is a random sequence of 0 and 1 determined randomly according to the key value from a user.

In embedding a watermark sequence into a middle frequency band, if the size of LH2 or HL2 is m×n and the length of the watermark sequence is 1, it is preferable that the watermark sequence is repeatedly embedded by $$\frac{m \times n}{l}$$

times to improve robustness. For example, a watermark sequence is once embedded rowwise into a middle frequency band matrix, and then a watermark sequence is sequentially embedded again or a watermark sequence is repeatedly embedded with a predetermined interval.

Meanwhile, one of the main characteristics of the present invention is as follows. A quantization step is adaptively updated according to importance of wavelet coefficient value and each coefficient value within the middle frequency band is quantized according to the watermark value by using the quantization step so that watermark sequence is embedded.

In more detail, a quarter of the coefficient whose absolute value is largest among all the wavelet coefficients of the middle frequency bands LH2 and HL2 is selected as a significant coefficient T. The middle frequency pair (MFP) which corresponds to the same location of the middle frequency band is made.

Figure 2:
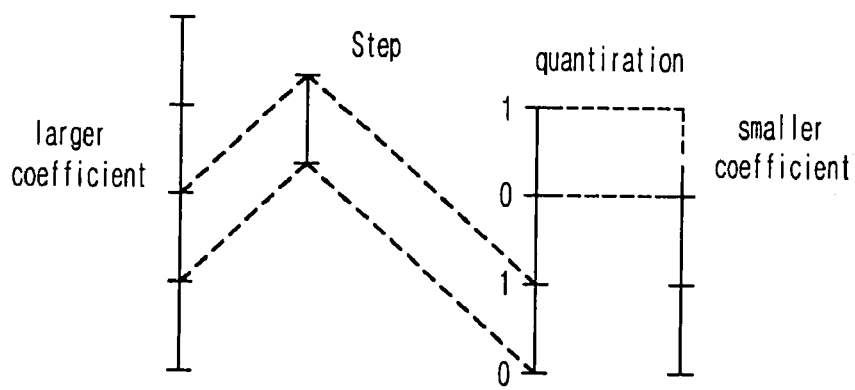
FIG. 2 illustrates a concept of quantization in watermark embedment according to the present invention.

If an absolute value of any one coefficient of a coefficient pair is larger than the significant coefficient, a quarter of the absolute value of the larger coefficient is determined to be a quantization step of the location. For example, as shown in FIG. 2, the quantization step is determined to be a quarter of the larger coefficient and the smaller coefficient is quantized by using the quantization.

If absolute values of both coefficients of a coefficient pair are smaller than the significant coefficient, both coefficients are quantized using a predetermined quantization step S. Such predetermined quantization step S is preferably determined to be an integer that is less than a quarter of the significant coefficient. Experimentally, since the significant coefficient is usually in the range from 15 to 25, the quantization step S is determined to be a proper value in the range from 2 to 5.

Meanwhile, in the present invention, the HVS model that imitates human psycho-visual characteristic is used so as to ensure invisibility after a watermark is embedded. Especially, a perceptual model based on noise visibility function (NVF) suggested by Voloshynovskiy is used.

The NVF expresses a noise visible degree when a noise is mixed with an image. The NVF gives a different value according to a local region of image. The value is in the range from 0 to 1. In other words, the NVF gives 1 in the flat region in which an image does not vary. The NVF gives a value approaching to 0 in the outline or edge region in which an image varies abruptly or rapidly.

The NVF can be obtained from a lowest frequency band LL2 according to equation 1.

$$nvf(i, j) = \frac{\sigma_{x_{max}}^2}{\sigma_{x_{max}}^2 + \theta \sigma_x^2(i, j)} \quad \text{Equation 1}$$

where $\sigma_x^2(i,j)$ is a local variance, $\sigma_{x_{max}}^2$ is a maximum local variance, and $\theta$ is an adjusting value.

The location (i, j) of the lowest frequency band LL2 corresponds to the same location (i, j) of the middle frequency bands LH2 and HL2.

Recognition visual mask for each location is calculated substituting NVF into equation 2.

Equation 2

$$\lambda = S_0(1-nvf)+S_1 \cdot nvf$$

where $S_0$ is watermark embedment strength of a edge region of the image and $S_1$ is watermark embedment strength of a flat region of the image.

The strength $S_1$ of the NVF of the flat region is set to be weak and the strength $S_0$ of (1−NVF) of the edge region is set to be strong so that the recognition visual mask is obtained. For example, $S_0$, $S_1$ and $\theta$ are set as follows: $S_0=20$, $S_1=5$ and $\theta=150$.

When the recognition visual mask is obtained as described above, the location into which the watermark is strongly embedded is confirmed using equation 3, and the quantization step for watermark embedment is obtained according to equation 4.

$$NVFAcpt(i, j) = \begin{cases} 1 & \text{if } \lambda(i, j) > \text{threshold} \\ 0 & \text{otherwise} \end{cases} \quad \text{Equation 3}$$

$$Quantize\_step(i, j) = \\ \begin{cases} maxcoef/4 & \text{if } NVFAcpt(i, j) == 1 \text{ and} \\ & \text{one of } MFP(i, j) > \text{significant coefficient} \\ S & \text{otherwise} \end{cases} \quad \text{Equation 4}$$

where MFP(i,j) is a coefficient pair of the middle frequency band and S is a quantization step defined as small value (e.g. 3) in advance.

Description will be made on equation 4. If the value of NVFAcpt(i,j) confirmed by the recognition visual mask as represented in equation 3 is 1 and an absolute value of any one coefficient of a coefficient pair of the middle frequency bands LH2 and HL2 is larger than the significant coefficient T, a quarter of the absolute value of the larger coefficient is determined to be a quantization step and the smaller coefficient is quantized by the quantization step so that a watermark is embedded.

In other case, if the value of NVFAcpt(i,j) is 0 or absolute values of both coefficients of a coefficient pair are smaller than the significant coefficient T, the coefficients of the middle frequency bands LH2 and HL2 are both quantized using a preset quantization step S.

On the other hand, in another embodiment to ensure invisibility, an HVS model is obtained using a just noticeable distortion (JND) instead of the NVF.

Figure 3:
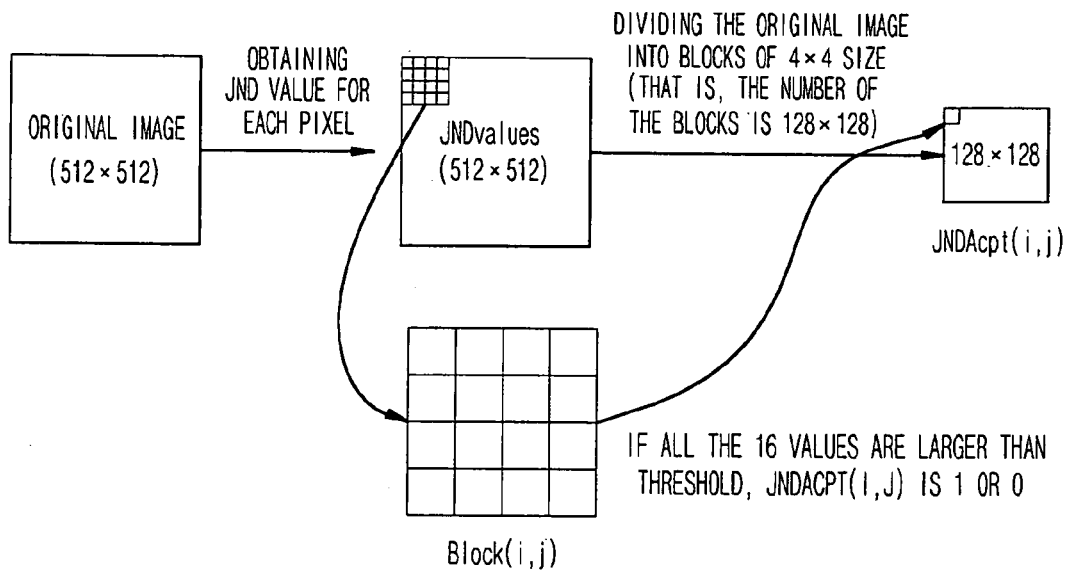
FIG. 3 illustrates a human visual system (HVS) model using just noticeable distortion (JND) according to the present invention.

FIG. 3 illustrates a process in which a JND value is obtained in the original image and JND acceptability for each location is determined.

Referring to FIG. 3, JND value for each pixel of the original image is obtained using pixel-wise JND estimation.

The original image is divided into blocks of a size of 4 pixels×4 pixels. If all the JND values of 16 pixels are larger than a predetermined threshold (e.g. average of JND values of an overall image) in each block, it is regarded that the block has JNDAcpt(i,j)=1, that is, JND-acceptable and the coefficients of the middle frequency bands LH2 and HL2 corresponding to the block are JND-acceptable.

It can be represented as equation 5. When using JND method, the value of JNDAcpt(i,j) instead of the value of NVFAcpt(i,j) is substituted into equations 4, 6 and 7.

$$JNDAcpt(i, j) = \begin{cases} 1 & \text{if } JND \text{ value of each pixel in block } (i, j) \text{ is larger than threshold} \\ 0 & \text{otherwise} \end{cases} \quad \text{Equation 5}$$

When quantization step is determined for each embedment location as described above, the coefficient of the middle frequency band LH2 or HL2 is quantized according to watermark value to be embedded as equation 6 so that a watermark sequence is embedded.

Equation 6

For all the LH2 and HL2 coefficients

If (abs(LH2(i,j))<T && abs(HL2(i,j))||NVFAcpt(i,j)==0)

A. Quantize LH2(i,j) and HL2(i,j) by S;

Else

A. Maxcoef=max(abs(LH2(i,j)), abs(HL2(i,j)));

B. Step=Maxcoef/D;

C. If Maxcoef==abs(LH2(i,j))

D. Quantize abs(HL2(i,j)) by Step;

E. Else

F. Quantize abs(LH2(i,j)) by Step;

G. End if

Else if

Else for

Equation 6 means as follows.

If the absolute values of both coefficients LH2(i,j) and HL2(i,j) of the middle frequency bands are smaller than the significant coefficient T or NVFAcpt(i,j) is 0, both coefficients are divided by the quantization step S of the predetermined smaller value. Otherwise, the smaller coefficient of the two coefficients is divided by a quarter of the larger coefficient.

If the value of the watermark to be embedded is 1, the division result is rounded off to the nearest odd number. If the value of the watermark to be embedded is 0, the division result is rounded off to the nearest even number. The rounded-off division result is quantized and multiplied by each quantization step so that a target coefficient value is changed according to the watermark value.

Referring to FIG. 2, for example, if coefficients L and S of some coefficient pair are 32 and 18 respectively and their NVFAcept value and the significant coefficient are 1 and 20 respectively, the quantization step is 8 (=32 (coefficient L)/4) according to equation 4. If the smaller coefficient is divided by the quantization step S, the division result is 2.25 (=18 (coefficient S)/8). Here, if the watermark value is 1, the smaller coefficient is rounded off and quantized to be odd number 3. Then, the odd number 3 is multiplied by the quantization step 8 so that the smaller coefficient is changed to 24 (=3×8). On the other hand, if the watermark value to be embedded is 0, the smaller coefficient is quantized to be even number 2 and the even number 2 is multiplied by the quantization step 8 so that the smaller coefficient is changed to 16 (=2×8).

As described above, if a watermark sequence is repeatedly embedded into the middle frequency bands LH2 and HL2, inverse wavelet transform is performed on the overall frequency band to generate a watermarked image.

Figure 4:
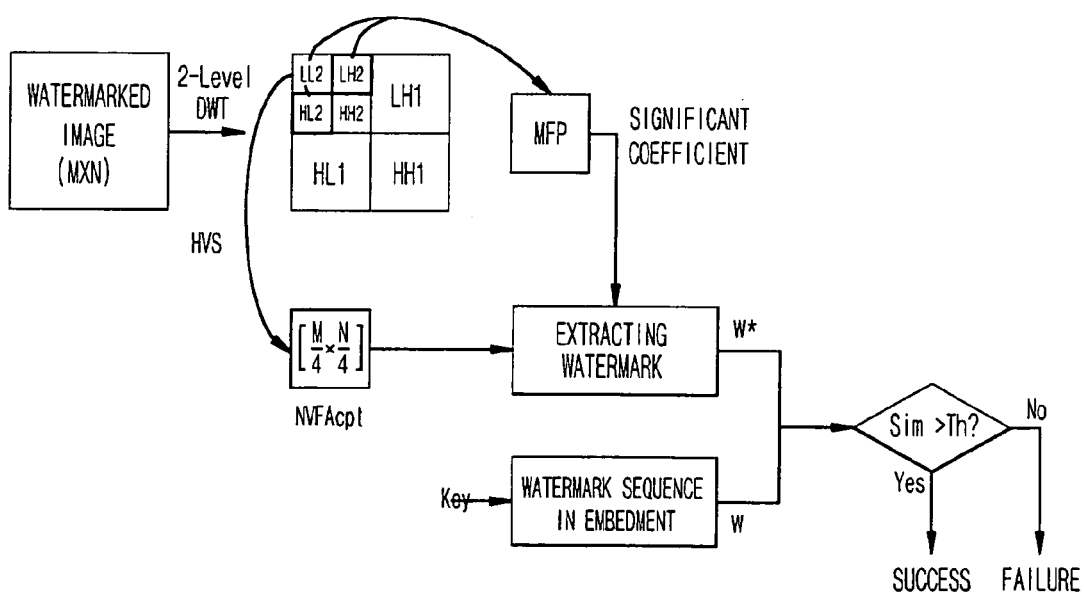
FIG. 4 illustrates a concept of watermark extraction according to the present invention.

On the other hand, FIG. 4 illustrates schematically a watermark extraction process according to the present invention.

Referring to FIG. 4, in the watermark extraction process of the present invention, two-step wavelet transform identical to that of embedment is performed on the watermarked image, and then the significant coefficient T is obtained in the middle frequency band as described above.

As described on the equations 1 to 4, NVFAcpt(i,j) is obtained from LL2 and absolute values of a coefficient pair are compared with the significant coefficient T so that the watermark sequence W* is extracted as equation 7. Of course, when using JND instead of NVF, JNDAcpt(i, j) is obtained from the watermarked overall image as described above. In equation 7, JNDAcpt(i, j) is substituted for NVFAcpt(i, j) in equation 7.

Equation 7

For all the LH2 and HL2 coefficients

If (abs(LH2(i,j))<T && abs(HL2(i,j))<T)||NVFAcpt(i,j)==0)

A. W*(i,j)=(LH2(i,j)/S mod 2+HL2(i,j)/S mod 2)/2;

Else

A. Maxcoef=max(abs(LH2(i,j)), abs(HL2(i,j)));

B. Step=Maxcoef/D;

C. If Maxcoef==abs(LH2(i,j))

D. W*(i,j)=HL2(i,j)/Step mod 2;

E. Else

F. W*(i,j)=LH2(i,j)/Step mod 2;

G. End if

End if

Else for

Equation 7 will be described. If absolute values of both coefficients of a coefficient pair are smaller than the significant coefficient or NVFAcpt(i,j)=0, each coefficient is divided by the predetermined small quantization step S, remainders are obtained by dividing the division result by two, the remainders are averaged and the watermark is extracted. Here, integer sequence of 0 and 1 is extracted as the watermark by using round-off.

On the other hand, if an absolute value of any one coefficient of a coefficient pair is larger than the significant coefficient and NVFAcpt(i,j)=1, a quarter of the absolute value of the larger coefficient is determined to be a quantization step, the smaller coefficient is divided by the quantization step, a remainder are obtained by dividing the division result by two, and the remainder 0 or 1 is extracted as the watermark.

Here, when a watermark sequence is repeatedly embedded, the watermark sequence is extracted as much as the number of repeat and then, bits of the same location are averaged, so that more reliable watermark sequence can be calculated. Here, it is preferable that bits are averaged with their quantization step as their weight rather than performing the simple average.

0 is replaced with −1 to change the extracted watermark sequence into bipolar sequence that has −1 and +1.

According to the process described above, when the watermark sequence W* is extracted from a digital contents, the watermark sequence W* is compared with a watermark sequence W according a key value from a user and similarity is calculated. If the similarity is larger than a predetermined threshold, it is determined that a watermark, that is, a copyright is embedded into the digital contents.

The method for blindly embedding and extracting a watermark by using wavelet transform and an HVS model according to the present invention described above can be stored in record media from which a computer can retrieve information. Such record media include all the types of record media in which programs and data are stored: for example, a read only memory (ROM), a random access memory (RAM), a compact disk (CD)-ROM, a digital video disk (DVD)-ROM, a magnetic tape, a floppy disk, an optical data storage, etc. Such record media are distributed to computer systems connected to network and store codes that can be read and executed by a computer.

As described above, in the method for blindly embedding and extracting a watermark by using wavelet transform and an HVS model according to the present invention, a watermark sequence is combined with an HVS model imitating a human visual system and embedded into the middle frequency band of wavelet transformation so that the watermark is robust against external attacks and good image quality is maintained even after a watermark is embedded. Invisibility is improved.

A uniform quantization step is not used but the quantization step adaptively determined according to the importance of coefficients of the middle frequency band is used to minimize degradation of image quality and make the watermark robust against various image process attacks such as filtration and data compression.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for blindly embedding a watermark into digital contents by using a human visual system (HVS) model and wavelet transform, the method comprising the steps of:
    (a) decomposing an original image by a wavelet and selecting a middle frequency band as a watermark embedment area;
    (b) obtaining an HVS model having a human visual recognition information at each embedment location;
    (c) adaptively determining the importance of coefficient value on each embedment location, combining the importance and the HVS model, and adaptively determining a quantization step for each embedding location;
    (d) quantizing each coefficients pair of embedment area by the quantization step and variably embedding a watermark sequence into a middle frequency band according to a value of the watermark; and
    (e) performing inverse wavelet transform on an overall area into which the watermark sequence is embedded, to generate a watermarked image;
    wherein step (c) further comprises the steps of:
    selecting, as a significant coefficient, a quarter of the coefficient whose absolute value is largest among all the coefficients of the middle frequency band; and
    comparing the significant coefficient with coefficient absolute value of each coefficient pair within the middle frequency band to determine importance of the coefficient value at each location.

2. The method of claim 1, wherein the step (a) comprises the steps of:
    performing wavelet transform on the original image by two or more steps; and
    defining the middle frequency band of the final step as a watermark embedment area.

3. The method of claim 1, wherein the step (b) comprises the steps of:
    obtaining a noise visibility function (NVF) for each location from a lowest frequency band according to a following equation:

$$nvf(i, j) = \frac{\sigma_{x_{max}}^2}{\sigma_{x_{max}}^2 + \theta \sigma_x^2(i, j)}$$

where $\sigma_x^2(i,j)$ is a local variance, $\sigma_{x_{max}}^2$ is a maximum local variance, and $\theta$ is an adjusting value;

calculating a recognition visual mask by substituting the NVF into a following equation: $\lambda = S_0(1-nvf) + S_1 \cdot nvf$ where $S_0$ is watermark embedment strength of an edge region of the image and $S_1$ is watermark embedment strength of a flat region of the image; and evaluating acceptability of the NVF depending on whether the calculated recognition visual mask exceeds a threshold, thereby obtaining the HVS model at each location.

4. The method of claim 1, wherein the step (b) comprises the steps of:
(b-1) decomposing the original image into blocks as many as the number of pixels of the middle frequency band; and
(b-2) evaluating whether or not to accept just noticeable distortion (JND) at each block, thereby obtaining the HVS model on each embedding location.

5. The method of claim 4, wherein in the step (b-2), if all the JND values of all the pixels of each block are greater than a predetermined threshold, the embedding location corresponding to the block is determined to accept JND and the HVS model on each embedding location is obtained.

6. The method of claim 1, wherein, in the step (c), if an absolute value of any one coefficient of a coefficient pair within the middle frequency band is larger than the significant coefficient and the embedding location is NVF-acceptable or JND-acceptable by the HVS model, a quarter of the absolute value of the larger coefficient is set to be a quantization step of the location and the smaller coefficient is set to be a watermarking target.

7. The method of claim 1, wherein, in the step (c), if absolute values of both coefficients of a coefficient pair within the middle frequency band are smaller than the significant coefficient or the embedding location is not NVF-acceptable nor JND-acceptable by the HVS model, a preset quantization step is applied to the location and both of the coefficients are set to be watermarking targets.

8. The method of claim 7 wherein, in the step (c), if the embedding location is not NVF-acceptable nor JND-acceptable by the HVS model or absolute values of both coefficients of a coefficient pair within the middle frequency band are smaller than the significant coefficient, a quarter of the significant coefficient is set to be a quantization step of the embedment location.

9. The method of claim 1, wherein the step (d) comprises the steps of:
dividing a target coefficient value by a quantization step of each location;
quantizing the division result by rounding the division result off to an approximate odd or even number according to a watermark value;
multiplying the quantization step to the quantization result, thereby updating the target coefficient value; and
embedding the watermark into the digital contents.

10. The method of claim 1, wherein step (d) further comprises repeatedly embedding into the middle frequency band a watermark sequence determined randomly according to a key value from a user.

11. A method for blindly extracting a watermark from digital contents by using wavelet transform and a HVS model, the method comprising the steps of:
(a) performing wavelet transform on a watermarked input image with the same order of embedment, and calculating a significant coefficient from a middle frequency band;
(b) obtaining the HVS model on each extraction location, which was used when embedding the watermark;
(c) comparing the significant coefficient with absolute value of each coefficient pair at each extraction location, confirming a quantization step of embedment for each extraction location by using the HVS model, and performing inverse quantization on a coefficient pair of each extraction location, thereby extracting the watermark sequence; and
(d) calculating similarity between the watermark sequence according to the a key value from the user and the extracted watermark sequence, thereby determining whether the watermark exits in the digital contents;
wherein step (c) comprises one of:
c1) determining that absolute values of both coefficients of a coefficient pair of the extraction location are smaller than the significant coefficient, or the HVS model is neither NVF, nor JND acceptable;
dividing both coefficients by a predetermined quantization step;
obtaining remainders by dividing the division result by two;
averaging the remainders; and
extracting the watermark;
c2) determining that an absolute value of any one coefficient of a coefficient pair of the extraction location is larger than the significant coefficient and that the HVS model is NVF-acceptable or JND-acceptable;
determining a quantization step to be a quarter of the absolute value of the larger coefficient;
dividing the smaller coefficient by the determined quantization step;
obtaining a remainder by dividing the division result by two;
extracting the watermark using the remainder; and
c3) determining that an absolute value of any one coefficient of a coefficient pair within the middle frequency band is larger than the significant coefficient;
determining that the embedding location is NVF or JND acceptable by the HVS model;
setting a quantization step of the location equal to a quarter of the absolute value of the larger coefficient; and
setting the smaller coefficient to be a watermarking target.

12. The method of claim 11, wherein, in the step (a), a quarter of the coefficient whose absolute value is largest among all the coefficients of the middle frequency band is selected as a significant coefficient.

13. The method of claim 11, wherein step (b) further comprises obtaining NVF acceptability and JND acceptability using the HVS model of each extraction location.

14. The method of claim 11, wherein, in the step (c), if the watermark sequence is repeatedly embedded into the digital contents, the watermark sequences are extracted as many as the repeat times, each bit of the same location is weighted with the quantization step and averaged, and a final mark sequence is calculated.

15. The method of claim 4, wherein, in the step (c), if an absolute value of any one coefficient of a coefficient pair within the middle frequency band is larger than the significant coefficient and the embedding location is NVF-acceptable or JND-acceptable by the HVS model, a quarter of the absolute value of the larger coefficient is set to be a quantization step of the location and the smaller coefficient is set to be a watermarking target.

16. The method of claim 5, wherein, in the step (c), if an absolute value of any one coefficient of a coefficient pair within the middle frequency band is larger than the significant coefficient and the embedding location is NVF-acceptable or JND-acceptable by the HVS model, a quarter of the absolute value of the larger coefficient is set to be a quantization step of the location and the smaller coefficient is set to be a watermarking target.

17. The method of claim 1, wherein, in the step (c), if an absolute value of any one coefficient of a coefficient pair within the middle frequency band is larger than the significant coefficient and the embedding location is NVF-acceptable or JND-acceptable by the HVS model, a quarter of the absolute value of the larger coefficient is set to be a quantization step of the location and the smaller coefficient is set to be a watermarking target.

18. The method of claim 3, wherein, in the step (c), if absolute values of both coefficients of a coefficient pair within the middle frequency band are smaller than the significant coefficient or the embedding location is not NVF-acceptable nor JND-acceptable by the HVS model, a preset quantization step is applied to the location and both of the coefficients are set to be watermarking targets.

19. The method of claim 4, wherein, in the step (c), if absolute values of both coefficients of a coefficient pair within the middle frequency band are smaller than the significant coefficient or the embedding location is not NVF-acceptable nor JND-acceptable by the HVS model, a preset quantization step is applied to the location and both of the coefficients are set to be watermarking targets.

20. The method of claim 5, wherein, in the step (c), if absolute values of both coefficients of a coefficient pair within the middle frequency band are smaller than the significant coefficient or the embedding location is not NVF-acceptable nor JND-acceptable by the HVS model, a preset quantization step is applied to the location and both of the coefficients are set to be watermarking targets.

21. The method of claim 1, wherein, in the step (c), if absolute values of both coefficients of a coefficient pair within the middle frequency band are smaller than the significant coefficient or the embedding location is not NVF-acceptable nor JND-acceptable by the HVS model, a preset quantization step is applied to the location and both of the coefficients are set to be watermarking targets.

22. The method of claim 13, wherein, in the step (c), if absolute values of both coefficients of a coefficient pair of the extraction location are smaller than the significant coefficient or the HVS model is not NVF-acceptable nor JND-acceptable, two coefficients are divided by a predetermined quantization step, remainders are obtained by dividing the division result by two, the remainders are averaged and the watermark is extracted.

23. The method of claim 13, wherein, in the step (c), if an absolute value of any one coefficient of a coefficient pair of the extraction location is larger than the significant coefficient and the HVS model is NVF-acceptable or JND-acceptable, a quarter of the absolute value of the larger coefficient is determined to be a quantization step, the smaller coefficient is divided by the quantization step, a remainder are obtained by dividing the division result by two, and the watermark is extracted using the remainder.

* * * * *